United States Patent [19]

Aaron et al.

[11] 4,259,693

[45] Mar. 31, 1981

[54] DEVICE FOR COMPRESSING BINARY SIGNALS

[75] Inventors: Gilles Aaron, Saint Michel sur Orge; Guy Hekimian, Brou, both of France

[73] Assignee: U.S. Philips Corporation, New York, N.Y.

[21] Appl. No.: 49,528

[22] Filed: Jun. 18, 1979

[30] Foreign Application Priority Data

Jun. 28, 1978 [FR] France .................................. 78 19278

[51] Int. Cl.³ .......................... H04H 1/00; G08C 9/00
[52] U.S. Cl. ............................. 358/261; 340/347 DD; 364/515
[58] Field of Search ............... 358/260, 261, 263, 133; 340/347 DD; 364/515

[56] References Cited

U.S. PATENT DOCUMENTS

| | | | |
|---|---|---|---|
| 3,927,251 | 12/1975 | White et al. .......................... | 358/261 |
| 3,937,871 | 2/1976 | Robinson .............................. | 358/260 |
| 3,956,578 | 5/1976 | de Loye et al. ...................... | 358/260 |

Primary Examiner—Robert L. Griffin
Assistant Examiner—Edward L. Coles
Attorney, Agent, or Firm—Thomas A. Briody; William J. Streeter; Edward W. Goodman

[57] ABSTRACT

A binary signal compression device for reducing the redundant information in a sequence of binary coded signal series on the basis of lines of picture elements. This device comprises a storage stage 1 for the consecutive series, a prediction stage 2 for the even series, a substitution stage 3 which substitutes the associated error signals for the predicted signals, a coding stage 4 comprising a one-dimensional coding stage 17 for the non-predicted odd series and a coding circuit 18 for the even series, and a clock stage 5. The coding circuit 18 divides the even series in blocks of the same length and codes these blocks in accordance with the number and the position of the binary signals contained in the blocks.

5 Claims, 12 Drawing Figures

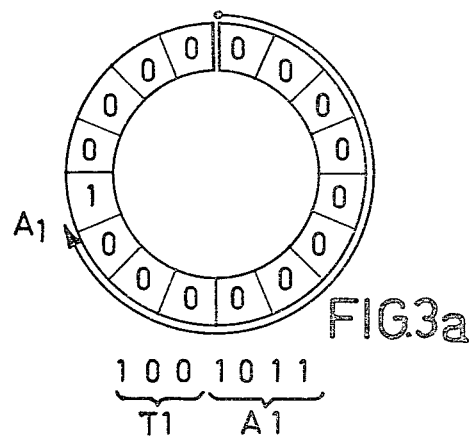
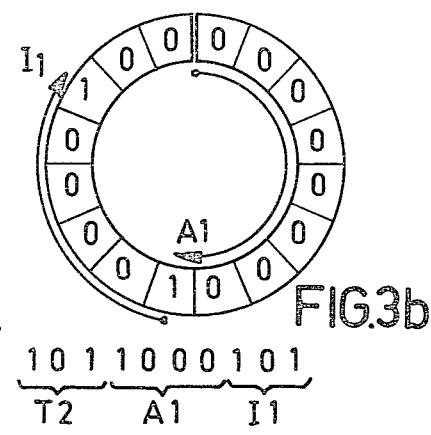
$\underbrace{1\ 0\ 0}_{T1}\ \underbrace{1\ 0\ 1\ 1}_{A1}$  $\underbrace{1\ 0\ 1}_{T2}\ \underbrace{1\ 0\ 0\ 0}_{A1}\ \underbrace{1\ 0\ 1}_{I1}$
$\underbrace{1\ 1\ 0\ 1\ 0}_{T3}\ \underbrace{1\ 1\ 0\ 1}_{A1}\ \underbrace{0\ 1\ 0}_{I1}\ \underbrace{1\ 0\ 0}_{I2}$  $\underbrace{1\ 1\ 0\ 1\ 1}_{T4} + B_0$
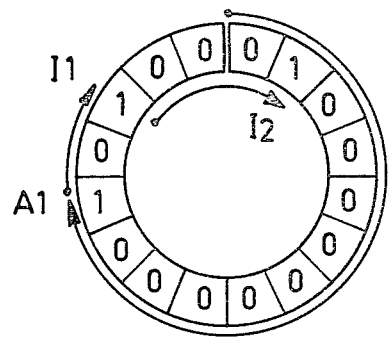
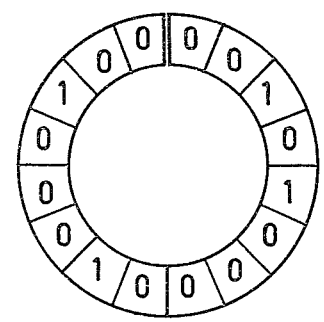
FIG.3c      FIG.3d
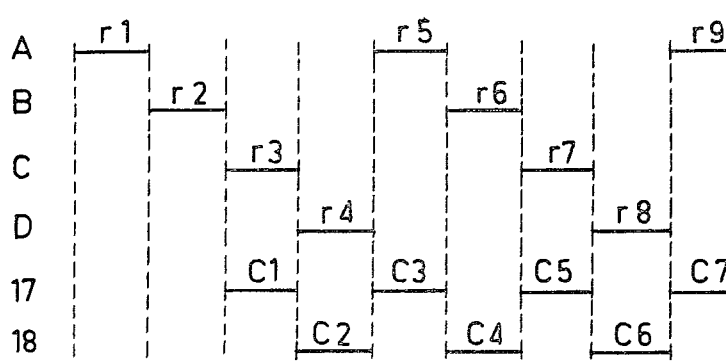
FIG.4

DEVICE FOR COMPRESSING BINARY SIGNALS

BACKGROUND OF THE INVENTION

The present invention relates to a device for compressing binary signals, particularly intended to be incorporated in a system for coded facsimile transmission of documents with the object of reducing the transmission time by reducing the length of the series of binary signals associated with the sequentially scanned lines of picture elements of the document to be transmitted.

The invention also relates to all coded facsimile document transmission systems having such a device for compressing binary signals.

A statistical study shows that in most documents to be transmitted the white characters are in the majority, the black information bearing characters being in the minority (in the further course of this description the characters will always be referred to as being white or black, but it must be understood that the invention is also applicable in those cases where the characters which constitute the information to be transmitted and the carrier of these characters are initially available in other colours). If a reduction in the transmission time is required, it is very important to compress the character areas which are met when scanning the picture constituted by the document. This compression can be obtained by means of a suitable binary coding of the picture elements of each scanned line of the document to be transmitted, using the horizontal correlation in each of these lines of picture elements; but the use of one-dimensional codes (such as, for example, the normalized EIA-BFICC code, recommended by the Comité Consultatif International de Téléphonie et Télégraphie) does not result in very high compression rates.

A greater reduction in the transmission time is obtained when the correlations between consecutive lines of the documents is used in combination with two-dimensional codes. The so-called sequential codes are, for example, used in which each line is coded with respect to the preceding line; to limit the risk of the propagation of errors, which are inherent in this coding method, one line out of k lines can be transmitted in a one-dimensional code. This sequential coding can for example be obtained by "predicting" the value of each considered picture element of the line, based on the picture elements of the line predicted at an earlier instant and being adjacent to the considered element and, possibly, based on the picture elements predicted at an earlier instant and being in the same line.

Predictive coding techniques have already been described, for example in the periodical "IBM Journal of Research and Development"(March 1974), Image Data Compression by Predictive Coding: Prediction and Encoding Algorithms, by: L. R. Bahl and H. Kobayashi. However, whatever the number of picture elements used in the predictors suggested in this periodical, the results of the prediction are mediocre in the areas of the document having many transitions. The quality of the prediction can be improved by increasing the number of picture elements belonging to the predictor, but this increase entails an exponential growth of the dimensions of the decision table and therefore of the associated store.

SUMMARY OF THE INVENTION

The invention has for its object to provide a device for compressing binary signals by means of a novel predictive coding technique, which results in a markedly improved compression rate with respect to previous implementations which were often characterized by redundant transmissions or which were relatively sensitive to transmission errors.

The invention therefore relates to a device for compressing binary signals, particularly intended to be incorporated in a system of coded facsimile transmission of documents to reduce the transmission time by reducing the length of the series of binary signals associated with sequentially scanned picture elements of a document to be transmitted in the form of a monochrome picture, characterized in that it comprises:

(a) a storage stage for dividing these series of binary signals into groups of n consecutive series which are sequentially entered in the store, the first series of the stored group present in the store being the last of the previously stored group;

(b) a prediction stage for utilizing the first and the last series of the group present in the store for consecutively allocating a predicted binary signal to each original binary signal of each of the other (n-2) intermediate series of this group, this predicted signal being determined in accordance with a statistical law on the basis of a predictor comprising, in the considered intermediate series, at least the previously predicted binary signal which is nearest to the considered original binary signal and, in each of the first and the last series, at least the binary signal nearest to the considered original binary signal in the intermediate series;

(c) a substitution stage for replacing each original binary signal of the (n-2) intermediate series by a binary difference signal which is obtained from a comparison between this original binary signal and the predicted binary signal associated therewith;

(d) a coding stage comprising a first circuit for coding the first and the last series of the group present in the store by means of a one-dimensional code of the "run-length code" type and a second circuit for coding the (n-2) intermediate series of the binary difference signals designed to perform the following operations on each (n-2) intermediate series:

dividing the series into blocks comprising q binary difference signals;

the determination in each block of the number r of the least frequent binary difference signals;

the transmission of a code word corresponding to this number r;

transmission of the block without it when r exceeds a predetermined value v and transmission of the addresses of these signals in the block when r differs from zero and is lower than or equal to v, the first address being defined by t bits with respect to the beginning of the block and each following address with respect to the preceding address and with t−1 bits;

(e) a clock stage to ensure synchronization of the operations of the other stages.

This device has the advantage of providing an efficient prediction of the binary signals of the intermediate series, more particularly in the embodiment in which the number n of the series of each group equals three. Actually, the predicting frame of each binary signal originated from these intermediate series surrounds this signal, which feature proves to have a very favourable influence on the efficiency of this prediction.

When the value 0 or 1 is alloted to the binary difference signal, depending on whether the originated binary signal and the predicted binary signal are identical or not, it is obvious that the number of zeros in the predicted intermediate series will be considerably higher than the number of ones (as the prediction is efficient, that is to say it is very often accurate). The number of binary signals to be transmitted is distinctly smaller than before the prediction. The one-dimensional coding of the first series and the original two-dimensional coding is very efficient for the intermediate series forming the last phase which is necessary to obtain the compressed message to be transmitted.

The invention also relates to a coded facsimile transmission system for documents, comprising a binary signal compression device as defined above, also comprising a transmission line for the compressed message and a restoring device for producing an exact copy of the original message which was transmitted in coded form after compression.

By means of this system it is possible to realise a total facsimile transmission of documents by providing a device capable to effect the operations which are the inversion to the operations performed by the compression device and to reconstruct the transmitted document, after the transmission line which receives the binary signals produced by the compression device.

DESCRIPTION OF THE DRAWINGS

Further details and advantages of the invention will become apparent from the following description and from the attached drawings which show, by way of non-limitative example, an embodiment of the invention and wherein:

FIGS. 3a—3d show examples of a circular representation of blocks having sixteen binary signals (in the form in which they appear at the input of the second coding circuit), and which provide a better understanding of the coding of the blocks which comprise one or several binary signals corresponding to the black picture elements to the document to be transmitted;

FIG. 4 shows schematically the course of the operations performed on the series and controlled by the clock stage of the compression device;

DESCRIPTION OF THE PREFERRED EMBODIMENT

Figures 1, 2A, 2B, 2C, 2D:
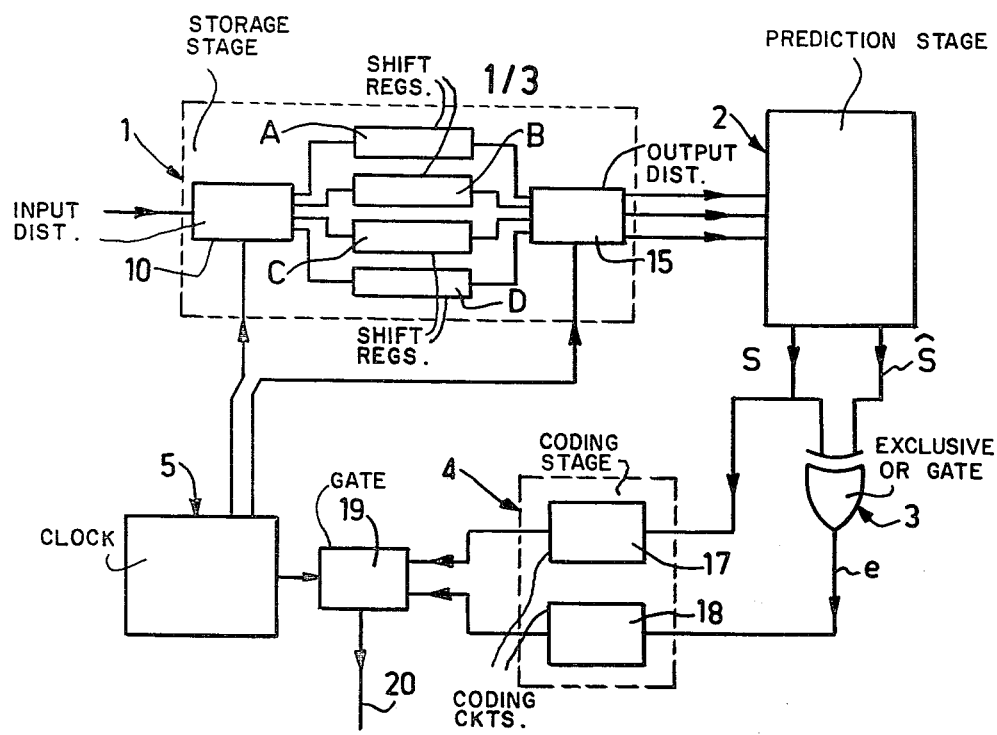
FIG. 1 shows an example of an implementation of the binary signal compression device according to the invention.
FIG. 2a shows the prediction frame utilized for the prediction performed in accordance with the invention, FIGS. 2b, 2c and 2d showing variations of the composition of the prediction frame.

The binary signal compression device described below with reference to a particular embodiment and to the FIGS. 1 to 4, comprises a storage stage 1, a prediction stage 2, a substitution stage 3 and a coding stage 4, in this order. A clock stage 5 is provided to ensure synchronous operation of the stages 1 and 4.

The storage stage 1 comprises an input distributor 10, which receives the continuous original binary signal streams, which is associated with the respective picture elements of the sequentially scanned lines of the document to be transmitted, and divides them in orderly series corresponding with these lines, four shift registers A, B, C and D, and an output distributor 15. Three registers contain the series of the order $2i-1$, $2i$ and $2i+1$, which constitute the groups present in the store ($i$=number of the group which varies regularly from 1 until its maximum value), and the fourth register contains, by way of reserve, the next series of the order $2i+2$. The first series of the group present in the store at a distinct instant is therefore the last one of the group previously stored and the last one will be the first one of the next group to be stored.

In the above described example the number of scanned lines (and consequently the series of binary signals to be transmitted) is equal to 2287 and the number of scanned picture elements of each line (and consequently the binary signals of each line) is equal to 1728, for a 21—29.7 cm document. The number of consecutive groups to be entered in the store is therefore equal to $i=(2287-1)/2=1143$. In this example (which corresponds to the most frequently occurring case), it is assumed that, as the facsimile transmission is to be effected in monochrome the line-by-line analysis of the document to be transmitted causes a binary signal 1 to correspond to the least frequent picture element in the document (generally a black picture element, corresponding to a black portion) and a binary signal 0 to correspond to the most frequent picture element (generally a white picture element, corresponding to a portion of the carrier on which black characters have been printed).

The prediction stage 2 has for its function to allot a predicted binary signal to each binary signal of the intermediate series (series of the order $2i$ for the group i present at the output of the storage stage 1). The rules for this prediction are based on the statistical analyses of a considerable number of documents, the results of this analyses being transferred to an internal store in the prediction stage 2. This internal store is a read-only store, or a so-called R.O.M. (Read-Only Memory, that is to say a memory which can only be read), having a capacity of 128 bits. The predicted binary signal is defined on the basis of an estimator (or prediction frame) as shown in FIG. 2a and comprises, in the example described here, the three binary signals of the preceding series (the first series, of the order $2i-1$, of the considered group) which are nearest to the binary signal of the intermediate series to which one wants to allot the predicted binary signal, the binary signal previously predicted in this intermediate series, and the three binary signals of the following series (the last series, of the order $2i+1$, of the considered group) which are nearest to the binary signal of the intermediate series to which one wants to allot the predicted signal.

This prediction frame or predictor is fixed and, in the example described here, comprises seven elements, which allows a very efficient estimation (or prediction). It would be possible to increase the number of elements forming this predictor, on the condition that the characteristic feature of the invention is maintained, namely that the predictor surrounds substantially fully and as close as possible the binary signal of the intermediate series to which one wants to allot the predicted binary signal. When the prediction has been carried into effect, the predicted binary signals and the original binary signal ŝ (of the intermediate series) to which it is allotted are simultaneously available at the output of the prediction stage 2.

It will be noted that at the beginning of the intermediate series for the first binary signal to which one wants to allot a predicted binary signal there is no previously predicted binary signal; in such a case, it is therefore assumed that this missing binary signal is equal to the most frequent binary signal in the series in their totality, that is to say equal to 0 (it is actually very much out of the common for black characters to be printed at the extreme edge of a document to be transmitted). This remark is made in a very general sense, as it also holds for all binary signals which are missing, at the beginning as well as at the end of the line, for the formation of the predictor which must enable the prediction: this missing signal is assumed to be equal to 0, which value is therefore inserted into the corresponding box of the predictor.

The signals $\hat{s}$ and s present at the output of the prediction stage are passed on to the substitution stage 3, which is constituted by a logic "exclusive-or" gate. The binary difference signal e present at the output of the gate is equal to 0 if $\hat{s}=s$ (that is to say if the prediction is correct) and equal to 1 if $\hat{s}$ differs from s (that is to say if the predicted binary signal differs from the binary signal of the intermediate series to which one wants to allot it). As the prediction performed according to the invention is very efficient, it is obvious that e is much more often equal to 0 than to 1. Therefore, at the output of the substitution stage 3 there are available the binary difference signals e which are used as substitutes for the original binary signals s of the intermediate series.

The original binary signals s of the first and of the last series of the order $2i-1$ and $2i+1$, present at the output of the prediction stage 2, are passed on to a first coding circuit 17 of the coding stage 4. The difference binary signals e of the intermediate series of the order $2i$, present at the output of the substitution stage 3, are passed on to a second coding circuit 18 of the stage 4.

The first coding circuit 17 uses a one-dimensional code of a known type, namely the normalized EIA-BFICC code mentioned above. The use of such a run-length code for coding one line of every two lines (in general one line of every $n-1$) ensures that the propagation of any transmission errors in the vertical direction (the direction in which the series follow one another) will be stopped.

The second coding circuit 18 has for its function to ensure the coding of the intermediate series of the order $2i$ (generally, the n-2 intermediate series separating the first and the second series of each group). It has been shown that the efficiency of the prediction is such that this intermediate series comprises a larger number of zeroes than of ones. It appeared that the EIA-BFICC code is not very suitable for a series having this structure, and preference is given to a code which will be described in detail herebelow with reference to FIGS. 3a and 3d and which constitutes the code used by the circuit 18:

(1) the range is divided into 108 blocks each having 16 binary signals (either 0 or 1);
(2) when one or more consecutive blocks contain only zeroes, a code word $C_k$ is transmitted which denotes the number k of this sequence of blocks (a block counter being used for this purpose);
(3) when a block contains not only zeroes, there are several possibilities:

(a) the block has one single 1 (FIG. 3a): a code word T1 (equal to 100 in the example described here) is transmitted, thereafter the address of this 1 in the block having four bits (since each block contains 16 binary signals), this address being determined by means of an address counter A1;
(b) the block contains two ones (FIG. 3b): a code word T2, (equal to 101 in the example described here) is transmitted, thereafter the address A1 of one of the ones having four bits, thereafter the address I1 of the other 1 relative to the first 1 having only three bits (using an interval counter and taking the fact that the block is circular into consideration, it is actually found that one of the two numbers of intervals between the two ones is of necessity lower than 8 for a block having 16 binary signals and can therefore be defined with only 3 bits;
(c) the block contains three ones (FIG. 3c): a code word T3 (equal to 11010 in the example described here) is transmitted, thereafter, also using interval counters I1 and I2 and taking the fact that the block is circular into consideration, the address of one of the ones having four bits, the address of an other 1 with respect to the first one, having three bits, and the address of the third 1 with respect to the second one also having three bits;
(d) the block contains four ones or more (FIG. 3d): a code word T4 (equal to 11011 in the example described here) is transmitted, thereafter the block Bo which contains the binary difference signals e obtained after prediction and substitution is transmitted unaltered, without being coded.

The output signals which were coded in the above-described manner by the circuits 17 and 18 of the coding stage 4 are available for transmission. Noteworthy here is the saving in bits which allows the above-defined coding of the blocks by means of the circuit 18. As this saving of one bit of each address is repeated many times during the transmission of the document, the quantity of information to be transmitted is considerably reduced as compared with the conventional coding method.

The clock stage 5 has for its function to ensure the synchronization of all the circuits comprised in the stages 1 and 4, which were described above. For this purpose the clock stage effects the distribution (by means of the distributors 10 and 15, respectively) of the series of binary signals entering or leaving the storage stage 1, and the rearrangement (by means of the gate 19) of the series of coded signals present at the output of the coding circuits 17 and 18 of the coding stage 4.

In FIG. 4 the four registers of the storage stage 1 are denoted by means of the references A, B, C and D, and the coding circuits of the coding stage 4 by means of reference numerals 17 and 18, respectively. The references $r_i$ indicate the series of the order i which are consecutively entered in the registers; the references $c_i$ indicate the coding operation of the corresponding series $r_i$ of the order i (the example described here shows that the odd series are coded by means of the one-dimensional code EIA-BFICC, and the even pairs by predictive coding in agreement with the above detailed description).

The clock stage 5 controls the operations which are performed on the series in the following sequence:
the first series is entered in the register A;
the second series is entered in the register B;

the third series is entered in the register C and, the first series is coded (one-dimensionally) simultaneously therewith;

the fourth series is entered in the register D and the second series is simultaneously coded (after prediction) on the basis of the series 1, 2, 3;

the fifth series is entered in the register A and the third series is simultaneously coded (one-dimensionally);

the sixth series is entered in the register B and the fourth series is simultaneously coded (after prediction) on the basis of the series 3, 4, 5; and so on until all series of binary signals (that is to say the lines of picture elements of the document to be transmitted) have been processed. The series available at the output of the storage stage 1 and applied to the prediction stage 2 are of the order 1, 2, 3 thereafter of the order 3, 4, 5 and thereafter of the order 5, 6, 7 etc. until the last group of three series.

The gate 19 which is controlled by the clock stage 5 and is provided at the output of the coding circuits 17 and 18 ensures the alternate stream of coded signals from each of these circuits (the odd series coming from circuit 17 and the even series coming from circuit 18) and their rearrangement towards a transmission line 20.

The binary signal compression device described above produces a compression rate which is approximately 30% higher than the rate obtainable with a one-dimensional run-length code. This performance is rendered possible by the efficiency of the prediction as well as by the novelty of the coding of blocks which constitute each predicted series to be transmitted. In addition, the one-dimensional coding of the odd series ensures that the propagation of any errors is immediately stopped and, by means of a different sequence in the clock stage 5, its use can be extended to the coding of even series in order to ensure the compatibility with transmission systems of different types.

Figure 5:
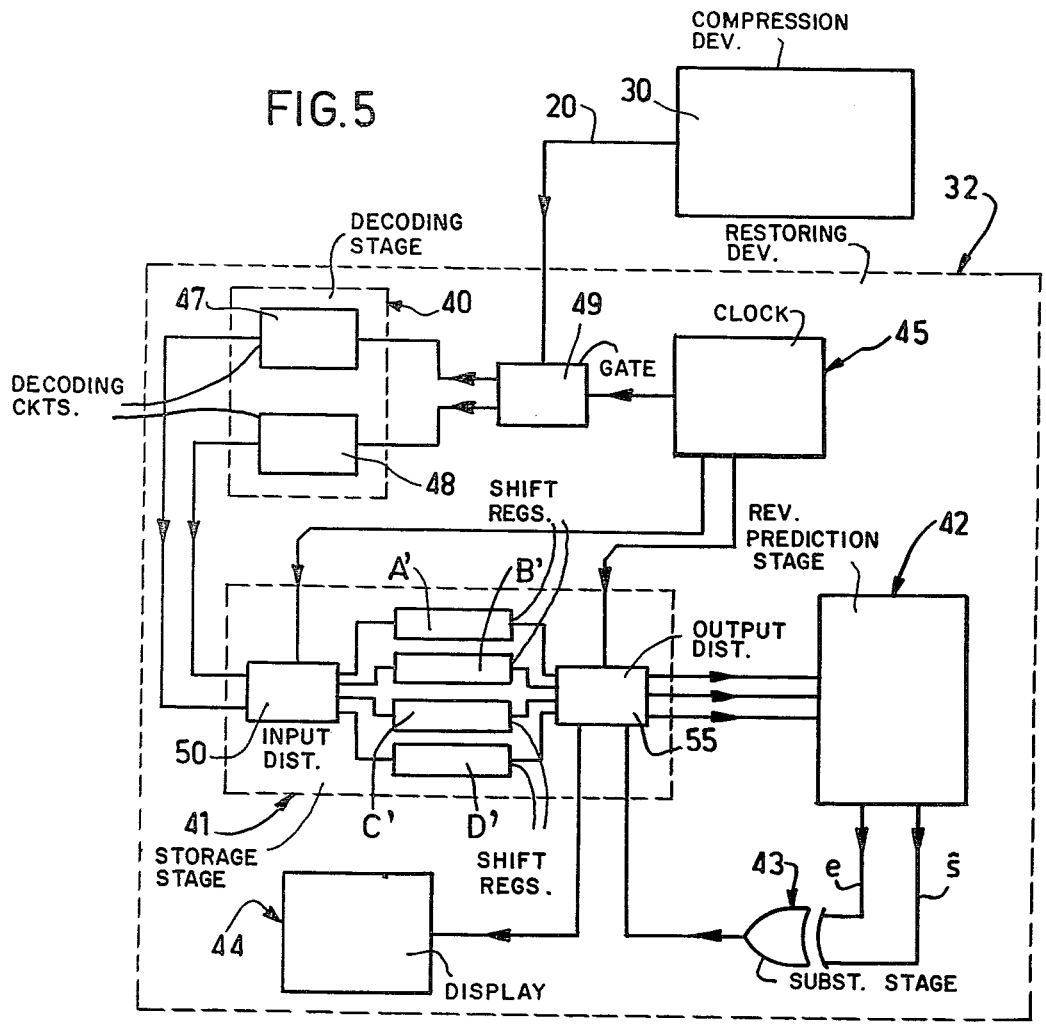
FIG. 5 shows a coded transmission system according to the invention.

Such a binary signal compression device is predominantly used in a coded facsimile transmission system for documents, which is shown in FIG. 5 and comprises a binary signal compression device 30, a transmission line 20 and a restoring device 32.

The compression device 30 of this system is of a construction as described above. The restoring device has for its function to receive the coded signals present at the output of the compression device 30 and transmitted over the line 20, and to restore a facsimile of the original document, which was transmitted in coded form after transmission and comprises for this purpose a decoding stage 40, a storage stage 41, a reverse prediction stage 42, a substitution stage 43, a dislay stage 44 and a clock stage 45.

The decoding stage 40 comprises a first decoding circuit 47 and a second decoding circuit 48, which ensure that the operation of the first and the second coding circuits 17 and 18, respectively, of the compression device 30 is reversed; the roles of these circuits 17 and 18 have been described in detail earlier in this description. The decoded signals at the output of the decoding stage are, at the output of the circuit 47, the odd series of original binary signals s defined previously, and at the output of the circuit 48, the even intermediate series of binary difference signals e, which were also defined previously; these series appear in their natural order at the input of the storage stage 41 (in the natural order of the sequentially scanned lines of picture elements of the document to which the series correspond).

This storage stage 41 comprises an input distributor 50, four registers A', B', C', D', in which the series are consecutively distributed as in the registers A, B, C, D, and an output distributor 55. Consecutive groups of three series of the order $2i-1$, $2i$, $2i+1$, corresponding to those which are successively stored in the stage 1 of the compression device 30 are sent from the registers to the inverse prediction stage 42.

This inverse prediction stage 42, which comprises also a 128 bit R.O.M., the content of which is identical to the content off the prediction stage 2, supplied after a prediction similar to that already described, a predicted binary signal corresponding to a binary difference signal e of the intermediate series of the order $2i$. This signal $\hat{s}$ and the difference binary signal e used to effect the inverse prediction are forwarded to the substitution stage 43. The stage 43, which is an exclusive-OR gate, supplies a binary signal s which is identical to $\hat{s}$ when $e=0$ and different from $\hat{s}$ when $e=1$. These signals s of the intermediate series $2i$ restore the intermediate series of the order $2i$ of the corresponding original group in the compression device 30.

The whole of the original binary signals, which correspond on the one hand to the first and the second series and on the other hand to the intermediate series, of each of the original groups previously defined is therefore again available from that moment onwards; these signals are passed on to the display device 44, which displays the restored facsimile of the compressed and transmitted document.

The clock stage 45 has the same function as in the compression device, namely to ensure the synchronization of all the circuits comprised on the above-described stages 40 and 44. To that end it is used to distribute (by means of a gate 49) the series of coded signals present on the transmission line 20 over either decoding circuit 47 or 48, as well as to distribute the series of binary signals entering into or leaving the storage stage 41 (by means of the distributors 50 and 55).

Figure 6:
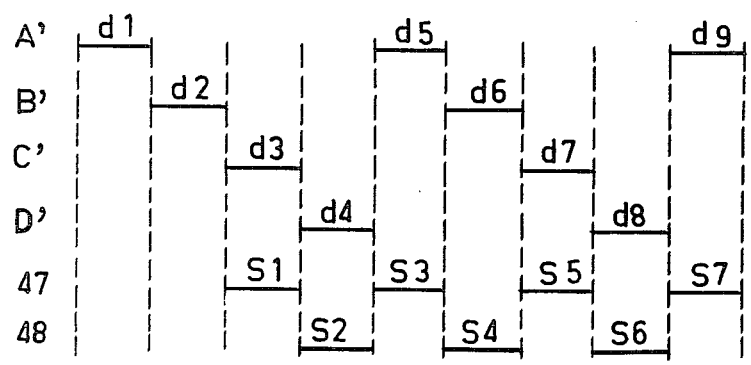
FIG. 6 shows schematically the course of the operations performed on the series and controlled by the clock stage of the restoring device of the coded transmission system.

In FIG. 6, the four registers of the storage stage 41 are denoted by means of the references A', B', C', D', and the decoding circuits of the decoding stage 40 by means of their references 47 and 48, respectively. The references $d_i$ denote the series of the order i which are sequentially decoded and thereafter entered into the registers, taking the natural order of these series into consideration (this order being determined by the initial scanning of the lines of the document to be transmitted); the references $s_i$ denote the restoring operation of the original binary signals of the series of the order i which correspond to the scanned lines of the document.

The clock stage 45 controls the operations performed on the series in the following sequence:

(one-dimensional) decoding of the series 1 to restore the original series of the order 1 and entering this series no. 1 in the register A';

decoding series 2 (which was coded after prediction in the compression device 30) and entering this series 2 in the register B';

(one-dimensional) decoding of series 3 to restore the original series no. 3, entering this series no. 3 in the register C', and the despatch of the binary signals $s_1$, restored from the original series no. 1 directly from the distributor 55 to the display device 44, while keeping this series no. 1 in the register A';

decoding the series no. 4 (which was coded after prediction in the compression device 30), entering this series no. 4 in the register D', inverse prediction of the series no. 2 to restore the original series no. 2, and despatching the binary signals s₂, restored from this original series 2 to the display stage 44 by means of the distributor 55;

(one-dimensional) decoding of the series no. 5 to restore the original series no. 5, entering this series no. 5 into the register A', and despatch of the binary signals s₃, restored from the original series no. 3 directly from the distributor 55 to the display stage 44, while maintaining this series no. 3 in the register C'; and so on until all the series of binary signals transmitted over line 20 have been processed.

The gate 49, which is controlled by the clock stage 45 and is provided between the output of the transmission line 20 and the circuits 47 and 48 of the decoding stage 40, ensures the alternate distribution of the series of signals sent by the compression device 30 in the line 20 to the decoding circuit 47 for the odd series and to the decoding circuit 48 for the even series.

The coded transmission system described above and, particularly, the binary signal compression device it comprises have, compared with prior realization, the advantage that it combines a considerable resistance to transmission errors with a very simple construction, as well as an efficiency which allows a very considerable reduction in the transmission time, as well as both a standard resolution and a high resolution.

It must be understood that the present invention is not limited to the embodiment described and shown above, but that it is possible to provide other methods and embodiments without passing beyond the scope of the invention.

It should be especially noted that as regards the predictive coding, the number of blocks which are transmitted without being subjected to this coding (they do not undergo this one-dimensional coding either because they have more than four binary signals corresponding to black picture elements and are therefore transmitted without being coded, or because they do not have one single binary signal corresponding to a black picture element, a one-dimensional coding of the run-length then being used) is generally amply sufficient to prevent any errors to be propagated from series to series. However, by way of additional certainty one could add to the described compression device a counter which periodically triggers the transmission of a block which has not been two-dimensionally coded (even if the content of this block justifies such a coding). The rate of these transmissions must be adapted to prevent them from having too large an effect on the efficiency obtained by the means according to the invention.

In the description of the prediction stage 2 and the inverse prediction stage 42, it was mentioned that each of these stages comprises an internal store of the R.O.M. type. The capacity of this store is related to the fixed predictor which is allocated for the prediction (direct or inverse) and is therefore equal to 128 bits ($=2^7$ bits) for a predictor having 7 binary signals. While remaining fixed, this predictor may contain a number b of different binary signals; in that case the corresponding capacity of the R.O.M. of the prediction stage 2 or the inverse prediction stage 42 is equal to $2^b$. Predictors other than those opted for in the described embodiment are shown in FIGS. 2b and 2d, the corresponding capacity of the R.O.M.'s being 8, 32, and 512 bits, respectively, for these alternative predictors.

Furthermore, when the signal block examined by the coding circuit 18 has four or more ones, it is no longer possible, after the appropriate code word T4 has been transmitted, to transmit the binary difference signals e but only the original binary signals s. This transmission of the non-processed signals can be realised in a simple manner by extending the compression device with an additional connection which connects the output s of the prediction stage 2 directly to the coding circuit 18 and by providing an additional register E' and a more elaborate distributor 55 in the storage stage 41 of the restoring device 32. This variant of the construction contributes towards a further reduction of the transmission errors.

What is claimed is:

1. A device for compressing binary signals, particularly intended to be included in a system for the coded facsimile transmission of documents with the object of reducing the transmission time by reducing the length of the series of binary signals associated with the sequentially scanned lines of picture elements of the document to be transmitted in the form of a monochrome picture, characterized in that it comprises:

(a) a storage stage for dividing these series of binary signals into groups of n consecutive series which are sequentially entered in the store, the first series of the stored group present in the store being the last series of the previously stored group;

(b) a prediction stage for using the first and the last series of groups present in the stage for consecutively allotting a predicted binary signal to each of the other (n−2) intermediate series of this group, this predicted signal being determined on the basis of a prediction frame comprising, in the considered intermediate series, at least the previously predicted binary signal which is nearest to the considered original binary signal and, in each of the first and the last series, at least the original binary signal nearest to the considered original binary signal in the intermediate series;

(c) a substitution stage for replacing each original binary signal of the (n−2) intermediate series by a binary difference signal resulting from the comparison of the original binary signal and the predicted binary signal associated therewith;

(d) a coding stage comprising a first circuit for coding the first and the last series of the group present in the store by means of a one-dimensional code of the "run-length code" type and a second circuit for coding the (n−2) intermediate series of the binary difference signals designed to perform the following consecutive operations on each (n−2) intermediate series:

dividing the series into blocks comprising q binary difference signals;

the determination in each block of the number r of the least frequent binary difference signals;

the transmission of a code word corresponding to this number r;

the transmission of the block without coding it when r exceeds a predetermined value;

transmitting the addresses of these signals in the block when r differs from zero and is lower than or equal to v, the first address being defined by t bits with respect to the beginning of the block and each following address with respect to the preceding address and with t−1 bits;

(e) a clock stage having for its function to ensure synchronization of the operations of the other stages.

2. A device as claimed in claim 1, characterized in that the value of the number n of the series of the groups consecutively present in the store is equal to three and in that the prediction frame comprises, in the single intermediate series of the group present in the store, the previously predicted binary signal and, in the first and the last series of the block, the three original binary signals which are nearest to the considered original binary signal in the intermediate series.

3. A device as claimed in one of the claims 1 or 2, characterized in that this substitution stage is an "exclusive-OR" gate for producing at its output the one or the other value of the two possible values of the binary difference signal depending on whether the considered original binary signal and the corresponding predicted signal are identical or not.

4. A device as claimed in claim 3, characterized in that the values of q, v and t are equal to 16, 3 and 4, respectively.

5. A coded facsimile transmission system of documents, characterized in that it comprises a binary signal compression device as claimed in claims 1 or 2 and in that it also comprises a transmission line for signals supplied by the compression device and a restoring device comprising:

(a) a decoding stage consisting of a first decoding circuit for the signals transmitted over the transmission line by the first coding circuit, and a second decoding circuit for signals transmitted over the transmission line by the second coding circuit, these first and second decoding circuits having for their function to restore the first and the last series of each original group and the (n−2) intermediate series of binary difference signals, respectively;

(b) a storage stage having for its function to divide the output signals of the decoding stage into groups of n consecutive series which correspond to those of the storage stage of the compression device;

(c) an inverse prediction and substitution stage having for its function to restore the original binary signals of the (n−2) intermediate series; and (d) a display stage which enables the reading of the facsimile of the document in the form of a monochrome picture, on the basis of the restored n original series.

* * * * *